(12) United States Patent
Muramatsu (10) Patent No.: US 7,592,121 B2
(45) Date of Patent: Sep. 22, 2009

(54) ANTIREFLECTION FILM, POLARIZING PLATE AND DISPLAY DEVICE

(75) Inventor: Yuuzou Muramatsu, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 94 days.

(21) Appl. No.: 10/531,320

(22) PCT Filed: Jan. 22, 2004

(86) PCT No.: PCT/JP2004/000559

§ 371 (c)(1),
(2), (4) Date: Apr. 13, 2005

(87) PCT Pub. No.: WO2004/066001

PCT Pub. Date: Aug. 5, 2004

(65) Prior Publication Data

US 2006/0063113 A1    Mar. 23, 2006

(30) Foreign Application Priority Data

Jan. 22, 2003   (JP)   ............... 2003-013922

(51) Int. Cl.
*G03F 7/00* (2006.01)
*G03F 7/004* (2006.01)

(52) U.S. Cl. .............. 430/270.1; 430/321; 430/905; 430/290; 430/950

(58) Field of Classification Search .............. 430/270.1, 430/321, 9, 950, 281.1, 286.1, 290
See application file for complete search history.

(56) References Cited

U.S. PATENT DOCUMENTS 4,526,920 A * 7/1985 Sakashita et al. .............. 522/78

(Continued)

FOREIGN PATENT DOCUMENTS

JP          5-214136        8/1993

(Continued)

OTHER PUBLICATIONS

Machine Translation of JP 2002-194250 cited by applicant.*

*Primary Examiner*—Amanda C. Walke
(74) *Attorney, Agent, or Firm*—Buchanan Ingersoll & Rooney PC (57) ABSTRACT

An antireflection film that has sufficient antireflection capability and antifouling property and is improved in scratch resistance, and a process for producing an antireflection film with considerably high productivity are provided, which is an antireflection film comprising a transparent support, a hard coat layer and a low refractive index layer, in this order, wherein the hard coat layer includes a polymerized product of (A) an ethylene oxide or propylene oxide adduct of a polyfunctional acrylate monomer and (B) a polyfunctional acrylate monomer having no oxide adduct.

13 Claims, 2 Drawing Sheets

U.S. PATENT DOCUMENTS

| | | | |
|---|---|---|---|
| 4,572,888 A * | 2/1986 | Maeda et al. | 430/288.1 |
| 5,663,211 A * | 9/1997 | Kominami et al. | 522/8 |
| 6,129,980 A * | 10/2000 | Tsukada et al. | 428/327 |
| 6,602,643 B2 * | 8/2003 | Nikaidou et al. | 430/24 |
| 6,713,170 B1 * | 3/2004 | Kaneko et al. | 428/323 |
| 2002/0039651 A1 * | 4/2002 | Murata | 428/354 |
| 2002/0085284 A1 | 7/2002 | Nakamura et al. | |
| 2002/0187324 A1 | 12/2002 | Shoshi et al. | |
| 2006/0181774 A1 * | 8/2006 | Ojima et al. | 359/586 |

FOREIGN PATENT DOCUMENTS

| | | |
|---|---|---|
| JP | 06-016734 A | 1/1994 |
| JP | 2001-51610 | 2/2001 |
| JP | 2001-162732 A | 6/2001 |
| JP | 2002-040204 A | 2/2002 |
| JP | 2002-194250 A | 7/2002 |
| WO | 01/81466 | 11/2001 |

* cited by examiner

ANTIREFLECTION FILM, POLARIZING PLATE AND DISPLAY DEVICE

TECHNICAL FIELD

The present invention relates to an antireflection film, a polarizing plate and a display device.

BACKGROUND ART

An antireflection film is generally used as the outermost layer of a display of a display device, such as a cathode ray tube (CRT), a plasma display panel (PDP), an electroluminescence display (ELD) and a liquid crystal display (LCD), and has such a function that reduces reflectivity through the principal of optical interference to prevent decrease in contrast and mirroring of images due to reflection of outside light.

Such an antireflection film has been known that contains a transparent support having thereon a hard coat layer and a low refractive index layer. It has also been known that the refractive index of the low refractive index layer should be sufficiently low for reducing the reflectivity of the antireflection film.

For example, in an antireflection film containing triacetyl cellulose as a support and an UV cured film of dipentaerythritol hexaacrylate as a binder main component of a hard coat layer, the refractive index of the low refractive index layer is necessarily 1.40 or less for obtaining an average reflectivity in a wavelength range of from 450 to 650 nm of 1.6% or less. Examples of a material having a refractive index of 1.40 or less include magnesium fluoride and calcium fluoride as an inorganic substance, and a fluorine compound having a large fluorine content as an organic substance. However, only such a film that has poor scratch resistance can be obtained from these fluorine compound due to the poor cohesive power thereof, and thus, they are not suitable for a film disposed as the outermost layer of a display. In the case where a conventional compound improving scratch resistance is used to ensure sufficient scratch resistance, on the other hand, it brings about such a problem that the reflectivity is increased.

As described in the foregoing, there has been such a problem in that both low reflectivity and improved scratch resistance cannot be simultaneously realized.

In order to solve the problem, such a technique has been proposed that the refractive index of the hard coat layer is increased to reduce the reflectivity (as shown, for example, in JP-A-7-287102). However, the hard coat layer having a high refractive index has problems in that color heterogeneity occurs on the film due to the large difference in refractive index with respect to the support, and the wavelength dependency of the reflectivity also increased.

An antiglare antireflection film excellent in gas barrier property, antiglare property and antireflection property has been also proposed (for example, in JP-A-7-333404). However, it requires a silicon oxide film produced by CVD and thus is inferior in productivity in comparison to those produced by wet coating.

In order to improve scratch resistance of a film for the outermost layer, adhesion of the respective functional layers may be improved. For example, adhesion of a photosensitive resin composition is improved by containing (A) a binder polymer containing a carboxyl group, (B) a photopolymerization initiator and (C) an ethylene oxide adduct of a trimethylolpropane triacrylate (as shown, for example, in JP-A-7-56334), but further improvement is demanded in scratch resistance.

DISCLOSURE OF THE INVENTION

An object of the invention is to provide an antireflection film that has sufficient antireflection capability and antifouling property and is improved in scratch resistance.

Another object of the invention is to provide a process for producing an antireflection film that has sufficient antireflection capability and antifouling property and is improved in scratch resistance, with considerably high production efficiency.

Still another object of the invention is to provide a polarizing plate and a display device comprising the antireflection film.

The invention provides an antireflection film, a polarizing plate and a display device having the following constitutions to attain the objects.

1. An anti-reflection film comprising a transparent support, at least one hard coat layer and a low refractive index layer, in this order, wherein the hard coat layer includes a polymerized product of (A) an ethylene oxide or propylene oxide adduct of a polyfunctional acrylate monomer and (B) a polyfunctional acrylate monomer having no oxide adduct.

2. The antireflection film as described in the item 1, wherein the polyfunctional acrylate monomer (A) has ethylene oxide or propylene oxide in a molar number of 1 to 3.

3. The antireflection film as described in the item 1 or 2, wherein the polyfunctional acrylate monomer (A) is an ethylene oxide adduct of trimethylolpropane tri(meth)acrylate.

4. The antireflection film as described in any one of the items 1 to 3, wherein the polyfunctional acrylate monomer (B) is a mixture of dipentaerythritol hexa(meth)acrylate and dipentaerythritol penta (meth) acrylate.

5. The antireflection film as described in any one of the items 1 to 4, wherein the hard coat layer includes a binder and matt particles having an average particle diameter of from 1.0 to 10.0 μm, and the binder has a refractive index of from 1.48 to 2.00.

6. The antireflection film as described in any one of the items 1 to 5, wherein the hard coat layer includes an inorganic filler containing at least one oxide selected from oxides of zirconium, titanium, aluminum, indium, zinc, tin, antimony and silicon.

7. The antireflection film as described in any one of the items 1 to 6, wherein the low refractive index layer includes an inorganic filler containing silica or magnesium fluoride.

8. The antireflection film as described in the item 7, wherein the inorganic filler contained in the low refractive index layer has an average particle diameter of from 0.001 to 0.2 μm.

9. The antireflection film as described in any one of the items 1 to 8, wherein each layer of the antireflection film is a cured film cured by irradiation of radiation or heat continuously after coating.

10. A process for producing an antireflection film, wherein the antireflection film is the antireflection film as described in any one of the items 1 to 9, and the process comprises: continuously winding off a transparent support in a roll form; and coating by a microgravure coating method at least one of a hard coat layer and a low refractive index layer on one surface of the transparent support thus wound off.

11. A polarizing plate comprising a polarizing film and two protective films, wherein at least one of the two protective films is the antireflection film as described in any one of the items 1 to 9.

12. A display device comprising the antireflection film as described in any one of the items 1 to 9, wherein the low refractive index layer of the antireflection film is the outermost layer of a display.

DESCRIPTION OF REFERENCE NUMERALS AND SIGNS 1 antiglare antireflection film
2 transparent support
3 smooth hard coat layer
4 antiglare hard coat layer
5 low refractive index layer
6 matt particles
(α) film introducing direction
(β) film conveying direction to next process
(a) step of introducing film
(b) step of stretching film
(c) step of transporting stretched film to next process
A1 catching position of film into retaining means and starting position of stretching of film (substantial starting point of retention on right side).
B1 catching position of film into retaining means (on left side)
C1 starting point of stretching of film (substantial starting point of retention on left side)
Cx releasing point of film and basic end position of stretching of film (substantial releasing point of retention on left side)
Ay basic end position of stretching of film (substantial releasing point of retention on right side)
|L1−L2| difference in travels between film retaining means on both sides
W substantial width of film at end of stretching process
θ angle formed between stretching direction and film conveying direction
21 center line of film introduced
22 center line of film transferred to next process
23 track of film retaining means (on left side)
24 track of film retaining means (on right side)
25 film introduced
26 film transferred to next process
27, 27' starting points of retention (catching) of film on both sides
28, 28' releasing points of film retention means on both sides

BEST MODES OF CARRYING OUT THE INVENTION (Antireflection Film)

Figure 1:
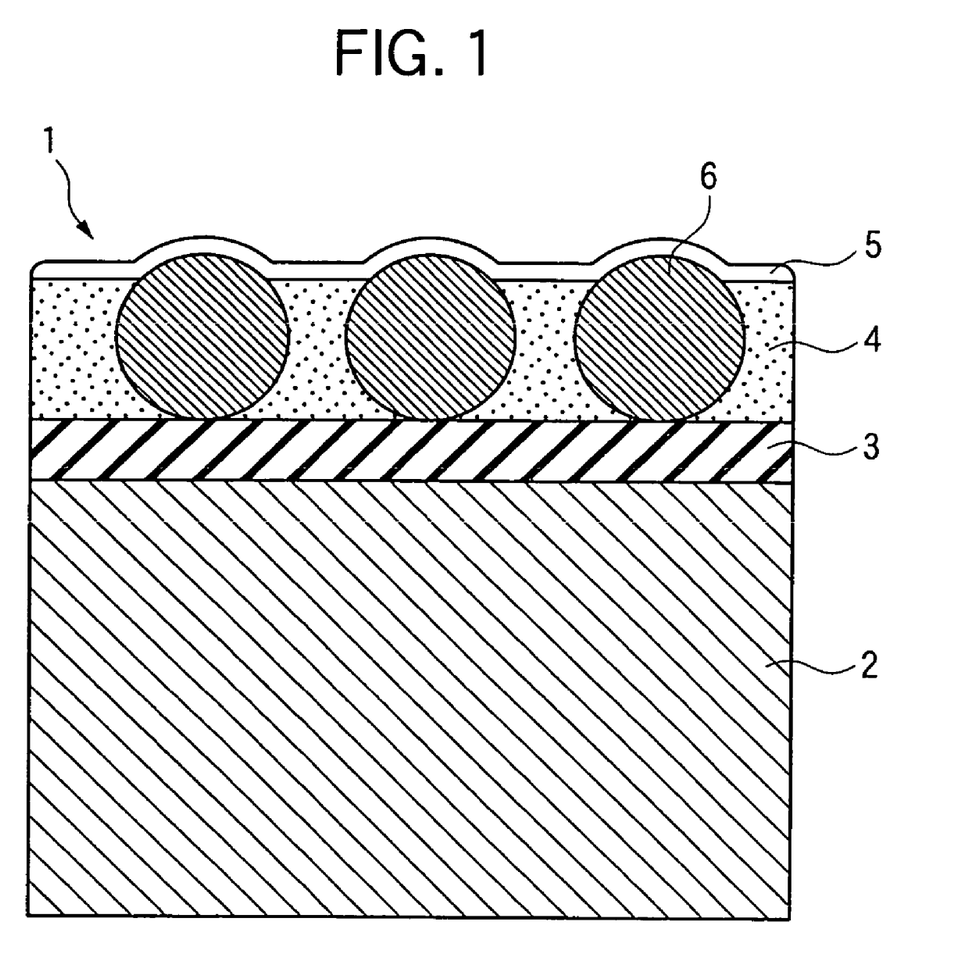
FIG. 1 is a schematic cross sectional view showing an embodiment of an antireflection film according to the invention.

A basic structure of an antireflection film preferred as an embodiment of the invention will be described below with reference to the drawing.

FIG. 1 is a schematic cross sectional view showing an embodiment of an antireflection film according to the invention, and in this case, an antireflection film 1 has a layer structure containing a transparent support 2, a smooth hard coat layer 3, an antiglare hard coat layer 4 and a low refractive index layer 5 in this order.

The antiglare hard coat layer 4 contains matt particles 6 dispersed therein. The material of the antiglare hard coat layer other than the matt particles 6 preferably has a refractive index of from 1.48 to 2.00, and the low refractive index layer preferably has a refractive index of from 1.38 to 1.49. Although the smooth hard coat layer 3 is not essential in the invention, it is preferably coated for improving the strength of the film. The smooth hard coat layer 3 and the antiglare hard coat layer 4 each may have a single layer structure or a multilayer structure containing, for example, from 2 to 4 layers. The low refractive index layer 5 may similarly have a single layer structure or a multilayer structure.

Another resin layer may be provided between the hard coat layer and the low refractive index layer, and an antifouling layer may be provided on the farther side of the support with respect to the low refractive index layer, for example, as the outermost layer.

(Hard Coat Layer)

The hard coat layer in the invention will be described.

The hard coat layer is formed with, as main components, a polymer for imparting binding property and hard coat property, and an inorganic filler for controlling the refractive index, preventing crosslinking shrinkage and improving the strength. In addition to the main components, matt particles for imparting antiglare property are added depending on necessity.

The hard coat layer of the invention contains a polymerized cured product of the following polyfunctional acrylate monomers (A) and (B).

(A) an ethylene oxide or propylene oxide adduct of a polyfunctional acrylate monomer (B) a polyfunctional acrylate monomer having no oxide added The acrylate monomer referred herein means an acrylate monomer having an acryloyl group and a methacrylate monomer having a methacryloyl group. The term "(meth)acrylate" referred herein means "acrylate or methacrylate".

In the invention, ethylene oxide is abbreviated by "EO", and propylene oxide is abbreviated by "PO", and the molar number of "EO" or "PO" is represented by "n".

In the oxide adduct of a polyfunctional acrylate monomer (A), the number n of EO or PO, in terms of average value, is preferably from 1 to 15, more preferably from 1 to 10, further preferably from 1 to 6, and particularly preferably from 1 to 3.

Specific examples of the monomer include the following compounds, but the invention is not limited to them.

A-1 EO adduct of trimethylolpropane tri(meth)acrylate (n=1)
A-2 EO adduct of trimethylolpropane tri(meth)acrylate (n=1.5)
A-3 EO adduct of trimethylolpropane tri(meth)acrylate (n=2)
A-4 EO adduct of trimethylolpropane tri(meth)acrylate (n=6)
A-5 PO adduct of trimethylolpropane tri (meth)acrylate (n=1)
A-6 PO adduct of trimethylolpropane tri(meth)acrylate (n=2)
A-7 EO adduct of glycerin tri(meth)acrylate (n=2)
A-8 PO adduct of glycerin tri(meth)acrylate (n=2)
A-9 EO adduct of pentaerythritol tetra(meth)acrylate (n=2)
A-10 PO adduct of pentaerythritol tetra(meth)acrylate (n=2)
A-11 EO adduct of ditrimethylolpropane tetra(meth)acrylate (n=2)
A-12 PO adduct of ditrimethylolpropane tetra(meth)acrylate (n=2)
A-13 EO adduct of dipentaerythritol penta(meth)acrylate (n=1.5)
A-14 EO adduct of dipentaerythritol hexa(meth)acrylate (n=1)

A-15 PO adduct of dipentaerythritol penta(meth) acrylate (n=1.5)

A-16 PO adduct of dipentaerythritol hexa(meth)acrylate (n=1)

A-17 tris(2-hydroxyethyl)isocyanurate tri(meth)acrylate

These monomers may be used in combination.

EO adduct of trimethylolpropane tri(meth)acrylate is preferred as the monomer (A). Among the aforementioned specific examples, A-1, A-2 and A-10 are particularly preferably used.

The polyfunctional acrylate monomer having no oxide added (B) means an ordinary polyfunctional monomer that has not been subjected to any addition treatment, and in particular, such a polyfunctional acrylate monomer is preferably used that has generally been known in this field of art for producing a radiation cured resin having high hardness. Specific examples of the monomer (B) include the following compounds, but the invention is not limited to them.

B-1 trimethylolpropane tri(meth)acrylate
B-2 trimethylolethane tri(meth)acrylate
B-3 pentaerythritol tetra(meth)acrylate
B-4 pentaerythritol tri(meth)acrylate
B-5 ditrimethylopropane tetra(meth)acrylate
B-6 ditrimethylopropane tri(meth)acrylate
B-7 dipentaerythritol hexa(meth)acrylate
B-8 dipentaerythritol penta(meth)acrylate
B-9 dipentaerythritol tetra(meth)acrylate
B-10 glycerin tri(meth)acrylate
B-11 1,2,3-cycloexane tri(meth)acrylate These compounds may be used in combination.

Among the aforementioned specific examples, B-3, B-7 and B-8 are preferred, and a mixture of B-7 and B-8 is also preferably used.

The total content of the polyfunctional monomers (A) and (B) is preferably from 3 to 100% by wight, more preferably from 10 to 100% by wight, and most preferably from 30 to 100% by wight, based on the binder polymer of the layer (addition layer), to which the monomers are added. The mixing ratio by weight of the polyfunctional acrylate monomer (B) to the polyfunctional acrylate monomer (A), i.e., (A)/(B), is preferably from 5/95 to 95/5, more preferably from 10/90 to 90/10, and further preferably from 20/80 to 80/20.

In order to improve the hard coat property, the compounds (A) and (B) are preferably those compounds that exhibit a high elastic modulus after polymerization curing.

Other compounds than the polymerized product of the polyfunctional acrylate monomers may be contained in the hard coat layer of the invention depending on necessity.

The other binder component than the polymerized product of the polyfunctional acrylate monomers (A) and (B) is preferably a polymer having a saturated hydrocarbon chain or a polyether chain as a main chain, and more preferably a polymer having a saturated hydrocarbon chain as a main chain.

The binder polymer having a saturated hydrocarbon chain as a main chain is preferably a polymer of an ethylenic unsaturated monomer. The binder polymer having a saturated hydrocarbon chain as a main chain and having a crosslinked structure is preferably a (co) polymer of a monomer having two or more ethylenic unsaturated groups.

Examples of the other compound having an ethylenic unsaturated group that can be used in the invention than the monomers (A) and (B) include an ester of a polyhydric alcohol and (meth)acrylic acid (such as ethylene glycol di(meth) acrylate and 1,4-cyclohexanediol diacrylate), vinyl benzene and a derivative thereof (such as 1,4-divinylbenzene, 4-vinylbenzoic acid 2-acryloylethyl ester and 1,4-divinylcyclohexanone), a vinylsulfone compound (such as divinylsulfone), an acrylamide compound (such as methylene bisacrylamide), polyurethane polyacrylate, polyester polyacrylate, and methacrylamide. These compounds may be used in combination of two or more of them.

In order that the hard coat layer has a high refractive index, it is preferred that the monomer contains in the structure thereof an aromatic ring or at least one atom selected from a halogen atom, a sulfur atom, a phosphorous atom and a nitrogen atom.

Specific examples of the high refractive index monomer include bis(4-methacryloylthiophenyl)sulfide, vinyinaphthalene, vinylphenylsulfide and 4-methacryloxyphenyl-4'-methoxyphenyl thioether. These monomers may be used in combination of two or more of them.

The binder polymer preferably has a crosslinked structure. Instead of or in addition to the monomer having two or more ethylenic unsaturated groups, a monomer having a crosslinking functional group is used to introduce a crosslinking functional group into the polymer, and a crosslinked structure can be introduced into the binder polymer through reaction of the crosslinking functional group.

Examples of the crosslinking functional group include an isocyanate group, an epoxy group, an aziridine group, an oxazoline group, an aldehyde group, a carbonyl group, a hydrazine group, a carboxyl group, a methylol group and an active methylene group. Vinylsulfonic acid, an acid anhydride, a cyanoacrylate derivative, melamine, etherified methylol, an ester, a urethane, tetramethoxysilane, and a metallic alkoxide may also be used as the monomer for introducing a crosslinked structure. Such a functional group may also be used that exhibits crosslinking property as a result of decomposition reaction, for example, a blocked isocyanate group. The binder polymer having a crosslinking functional group can form a crosslinked structure by heating after coating.

The polymerization of the monomer having an ethylenic unsaturated group can be carried out by irradiation of an ionizing radiation or heating in the presence of a photo radical polymerization initiator or a thermal radical polymerization initiator.

Accordingly, it is preferred in the antireflection film of the invention that a coating composition containing at least a monomer having an ethylenic unsaturated group containing the polyfunctional acrylate monomers (A) and (B) of the invention, a photo radical polymerization initiator or a thermal radical polymerization initiator, the matt particles and the inorganic filler is prepared, and the coating composition is coated on the transparent support, followed by curing through polymerization reaction with an ionizing radiation or heat, whereby an antireflection film is formed.

Examples of the photo radical polymerization initiator include an acetophenone compound, a benzophenone compound, a Michler's benzoylbenzoate, an amyloxime ester, tetramethylthiram sulfide and a thioxanthone compound.

In particular, a photo radical polymerization initiator of a photocleavage type is preferred. The photocleavage type photo radical polymerization initiator is described in Saishin UV Kouka Gijutsu (Newest UV Curing Technique), p. 159, published by K. Takasusuki, Gijutsu Joho Kyokai Co., Ltd. (1991).

Examples of a commercially available photocleavage type photo radical polymerization initiator include Irgacure (651, 184 and 907), produced by Ciba Geigy Ltd.

The photopolymerization initiator is preferably used in an amount of from 0.1 to 15 parts by weight, and more preferably from 1 to 10 parts by weight, per 100 parts by weight of the polyfunctional monomer.

A photosensitizing agent may be used in addition to the photopolymerization initiator. Specific examples of the photosensitizing agent include n-butylamine, triethylamine, tri-n-butylphosphine, a Michler's ketone and thioxanthone.

The polymer having a polyether chain as a main chain is preferably a ring-opening polymerization product of a polyfunctional epoxy compound. The ring-opening polymerization of a polyfunctional epoxy compound can be carried out by irradiation of an ionizing radiation or by heating in the presence of a photo acid generating agent or a thermal acid generating agent.

Accordingly, the antireflection film can be formed in such a manner that a coating composition containing a polyfunctional epoxy compound, a photo acid generating agent or a thermal acid generating agent, the matt particles and the inorganic filler is prepared, and the coating composition is coated on the transparent support, followed by curing through polymerization reaction with an ionizing radiation or heat.

The hard coat layer may contain matt particles having a larger average particle diameter than the inorganic filler described later, in order to imparting antiglare property. The matt particles preferably have an average particle diameter of from 1 to 10 µm, and more preferably from 1.5 to 7.0 µm.

Examples of the matt particles include particles of an inorganic compound and resin particles. Preferred specific examples of the matt particles include particles of an inorganic particles, such as silica particles, TiO2 particles and ZrO2 particles, and resin particles, such as crosslinked acrylic particles, crosslinked styrene particles, melamine resin particles and benzoguanamine resin particles. Among these, crosslinked acrylic particles and crosslinked styrene particles are preferred.

The matt particles may have either a true spherical shape or an irregular shape.

Two or more different kinds of matt particles may be used in combination.

The matt particles are preferably contained in the hard coat layer in an amount of from 10 to 1,500 $mg/m^2$, and more preferably from 100 to 1,000 $mg/m^2$, in terms of the amount of the matt particles in the hard coat layer.

It is a particularly preferred embodiment that crosslinked methylmethacrylate particles or crosslinked styrene particles are used as the matt particles, and matt particles having such a diameter that is larger than ½ of the thickness of the hard coat layer occupy from 30 to 100% of the whole matt particles. The particle diameter varies depending on purposes, and in the case of monodisperse particles, particularly, two or three kinds of particles are often used in combination. The particle size distribution of the matt particles is measured by the Coulter Counter method, and the distribution thus measured is converted to a particle number distribution. The average particle diameter is calculated based on the particle number distribution.

In order to increase the refractive index of the hard coat layer, the hard coat layer preferably contains, in addition to the matt particles, an inorganic filler containing a metallic oxide having an average particle diameter of 0.2 µm or less, preferably 0.1 µm or less, and more preferably 0.06 µm or less. The lower limit of the average particle diameter is preferably 0.0001 µm or more, and more preferably 0.001 µm or more.

The inorganic filler contained in the hard coat layer is preferably an inorganic filler containing at least one oxide selected from oxides of zirconium, titanium, aluminum, indium, zinc, tin, antimony and silicon.

It is preferred in the antiglare hard coat layer using high refractive index matt particles that an inorganic filler containing an oxide of silicon is preferably used to lower the refractive index of the layer, whereby the difference in refractive index between the matt particles and the other part than the matt particles is increased.

Specific examples of the inorganic filler used in the hard coat layer include $TiO_2$, $ZrO_2$, $Al_2O_3$, $In_2O_3$, $ZnO$, $SnO_2$, $Sb_2O_3$, ITO and $SiO_2$, and $TiO_2$ and $ZrO_2$ are particularly preferred from the standpoint of attaining a high refractive index. The inorganic filler is preferably subjected to a silane coupling treatment or a titanium coupling treatment on the surface thereof, and such a surface treating agent is preferably used that endows a functional group capable of reacting with the binder species to the surface of the filler.

The addition amount of the inorganic filler is preferably from 10 to 90%, more preferably from 20 to 80%, and particularly preferably from 30 to 75%, based on the total wight of the hard coat layer.

The filler has a particle diameter smaller than the wavelength of light and thus causes no scattering, and therefore, a dispersed body obtained by dispersing the filler in the polymer constituting the binder behaves as an optically uniform substance.

The binder of the antiglare hard coat layer of the invention, i.e., the mixture containing the polymer and the inorganic filler as main components, preferably has a refractive index of from 1.48 to 2.00, and more preferably from 1.50 to 1.80. In order to attain a refractive index within the range, the species and the proportions of the binder polymer and the inorganic filler may be appropriately selected.

The hard coat layer of the invention preferably has a thickness of from 1 to 10 µm, and more preferably from 1.2 to 6 µm.

In order to ensure surface uniformity of the hard coat layer of the invention, particularly that without coating unevenness, drying unevenness and spot defects, the hard coat layer is preferably produced by using a fluorine surface active agent, a silicone surface active agent or both of them in a coating composition for forming the antiglare hard coat layer. In particular, a fluorine surface active agent is preferably used since it prevents surface defects of the antireflection film of the invention, such as coating unevenness, drying unevenness and spot defects, with a small addition amount.

Preferred examples of the fluorine surface active agent include a perfluoroalkylsulfonic acid amide group-containing nonion, such as Fluorad FC-431, produced by Sumitomo 3M, Ltd., and a perfluoroalkyl group-containing oligomer, such as Megafac F-171, F-172, F-173 and F-176PF, produced by Dainippon Ink and Chemicals, Inc. Examples of the silicone surface active agent include those obtained by modifying ends of the side chain or the main chain of an oligomer, such as ethylene glycol and propylene glycol, with various kinds of substituents, such as polydimethylsiloxane.

In the antireflective film of the invention, it is preferred for improving the film strength that a so-called smooth hard coat layer having no antiglare property is provided, which is generally coated between the transparent support and the antiglare hard coat layer.

The material for the smooth hard coat layer may be the same as the antiglare hard coat layer except that no matt particle for imparting antiglare property is used, and may be formed mainly from a binder polymer and an inorganic filler.

In the smooth hard coat layer in the invention, the inorganic filler is preferably silica or alumina, and particularly preferably silica, from the standpoint of strength and versatility. The inorganic filler is preferably subjected to a silane coupling treatment on the surface thereof, and such a surface treating agent is preferably used that endows a functional group capable of reacting with the binder species to the surface of the filler.

The addition amount of the inorganic filler is preferably from 10 to 90%, more preferably from 20 to 80%, and particularly preferably from 30 to 75%, based on the total wight of the hard coat layer. The smooth hard coat layer preferably has a thickness of from 1 to 10 μm, and more preferably from 1.2 to 6 μm.

(Low Refractive Index Layer)

The low refractive index layer of the invention will be described.

The refractive index of the low refractive index layer of the antireflection film of the invention is generally from 1.38 to 1.49, and more preferably from 1.38 to 1.44.

It is preferred that the low refractive index layer satisfies the following equation (1) from the standpoint of attaining a low reflectivity.

$$(m\lambda/4) \times 0.7 < n_1 d_1 < (m\lambda/4) \times 1.3 \quad (1)$$

In the equation (1), m represents a positive odd number, $n_1$ represents the refractive index of the low refractive index layer, and $d_1$ represents the thickness of the low refractive index layer. $\lambda$ represents a wavelength, which is in a range of from 500 to 550 nm.

The case where the equation (1) is satisfied means that there is such a value of m (which is a positive odd number, generally 1) that satisfies the equation (1) within the wavelength range.

The materials for forming the low refractive index layer will be described.

The low refractive index layer of the invention preferably contains a fluorine-containing polymer as a low refractive index binder component. The fluorine-containing polymer is preferably such a fluorine-containing polymer that has a dynamic friction coefficient of from 0.03 to 0.15 and a contact angle to water of from 90 to 120° and is capable of being crosslinked under heat or irradiation of an ionizing radiation.

Examples of the crosslinking fluorine-containing polymer used in the low refractive index layer include perfluoroalkyl group-containing silane compound (such as (heptadecafluoro-1,1,2,2-tetrahydrodecyl)triethoxysilane), and a fluorine-containing polymer containing a fluorine-containing monomer and a monomer imparting crosslinking property as constitutional units.

Specific examples of the fluorine-containing monomer unit include a fluoroolefin (such as fluoroethylene, vinylidene fluoride, tetrafluoroethylene, hexafluoropropylene and perfluoro-2,2-dimethyl-1,3-dioxole), a partially or completely fluorinated alkyl ester derivative of (meth)acrylic acid (such as Viscoat 6FM, produced by Osaka Organic Chemical Industry, Ltd., and M-2020, produced by Daikin Industries, Ltd.), and a completely or partially fluorinated vinyl ether compound.

Examples of the monomer for imparting crosslinking property include a (meth)acrylate monomer having a crosslinking functional group in the molecule in advance, and a (meth)acrylate monomer having a carboxyl group, a hydroxyl group, an amino group, a sulfonic acid group or the like (such as (meth)acrylic acid, methylol (meth)acrylate, hydroxyalkyl (meth)acrylate and allyl acrylate). The latter can introduce a crosslinked structure after copolymerization as described in JP-A-10-25388 and JP-A-10-147739.

The fluorine-containing polymer may contain only a fluorine-containing monomer as constitutional units, or may be a copolymer of a fluorine-containing monomer and a monomer containing no fluorine atom. The monomer unit that can be used in combination is not particularly limited, and examples thereof include an olefin compound (such as ethylene, propylene, isoprene, vinyl chloride and vinylidene chloride), an acrylate ester compound (such as methyl acrylate, ethyl acrylate and 2-ethylhexyl acrylate), a methacrylate ester compound (such as methyl methacrylate, ethylmethacrylate, butyl methacrylate and ethylene glycol dimethacrylate), a styrene derivative (such as styrene, divinylbenzene, vinyltoluene and α-methylstyrene), a vinyl ether compound (such as methyl vinyl ether), a vinyl ester compound (such as vinyl acetate, vinyl propionate and vinyl cinnamate), an acrylamide compound (such as N-tert-butylacrylamide and N-cyclohexylacrylamide), a methacrylamide compound and an acrylonitrile derivative.

The fluorine-containing polymer preferably contains a polysiloxane structure for imparting antifouling property. The method for introducing a polysiloxane structure is not particularly limited, and preferred examples thereof include a method of introducing a polysiloxane block copolymerization component by using a silicone macro azo initiator as described in JP-A-11-189621, JP-A-11-228631 and JP-A-2000-313709, and a method of introducing a polysiloxane graft copolymerization component by using a silicone macromer as described in JP-A-2-251555 and JP-A-2-308806. The content of the polysiloxane component in the fluorine-containing polymer is preferably from 0.5 to 10% by weight, and particularly preferably from 1 to 5% by wight.

Addition of a reactive group-containing polysiloxane, instead of the aforementioned procedures, is also preferred for imparting antifouling property (for example, KF-100T, X-22-169AS, KF-102, X-22-3701IE, X-22-164B, X-22-5002, X-22-173B, X-22-174D, X-22-167B and X-22-161AS, all trade names, produced by Shin-Etsu Chemical Co., Ltd., AK-5, AK-30 and AK-32, all trade names, produced by Toagosei Co., Ltd., and Silaplane FM0275 and Silaplane FM0721, all trade names, produced by Chisso Corp.). The polysiloxane is preferably added in an amount of from 0.5 to 10% by weight, and particularly preferably from 1 to 5% by weight, based on the total solid content of the low refractive index layer.

In the low refractive index layer of the invention, an inorganic filler is preferably used for improving the film strength. The inorganic filler used in the low refractive index layer is preferably those having a low refractive index, and preferred examples of the inorganic filler include silica and magnesium fluoride, with silica being particularly preferred.

The inorganic filler preferably has an average particle diameter of from 0.001 to 0.2 μm, and more preferably from 0.001 to 0.05 μm. The particle diameter of the filler is preferably uniform (monodisperse) as much as possible.

The addition amount of the inorganic filler is preferably from 5 to 90% by wight, more preferably from 10 to 70% by wight, and particularly preferably from 10 to 50% by wight, based on the total weight of the low refractive index layer.

The inorganic filler is preferably subjected to a surface treatment. Examples of the surface treatment include a physical surface treatment, such as a plasma discharge treatment and a corona discharge treatment, and a chemical surface treatment using a coupling agent, and the use of a coupling agent is preferred. As the coupling agent, an organoalkoxy metallic compound (such as a titanium coupling agent and a silane coupling agent) is preferably used. In the case where the inorganic filler is silica, a silane coupling treatment is particularly effective.

(Organosilane Compound)

It is preferred from the standpoint of scratch resistance that at least one layer of the hard coat layer and the low refractive index layer of the invention contains a hydrolysate of an organosilane compound or a partial condensate thereof, i.e., a so-called sol component.

The organosilane compound is not particularly limited, and, for example, the following specific compounds can be preferably used.

S-1 $CH_2$=CHCOO$(CH_2)_3$—Si—$(OCH_3)_3$
S-2 $CH_2$=C$(CH_3)$ COO$(CH_2)_3$—Si—$(OCH_3)_3$
s-3 $CH_2$=CHCOO$(CH_2)_4$—Si—$(OCH_3)_3$
S-4 $CH_2$=C$(CH_3)$ COO$(CH_2)_3$—Si—$(OC_2H_5)_3$
S-5 $CH_2$=C$(CH_3)$ CONH$(CH_2)_3$—Si—$(OCH_3)_3$

The hydrolysis reaction and the condensation reaction of the organosilane compound can be carried out without any solvent or in a solvent, and it is preferred to use an organic solvent for uniformly mixing the components. For example, an alcohol, an aromatic hydrocarbon, an ether, a ketone and an ester can be preferably used.

The solvent is preferably those dissolving the organosilane and a catalyst. An organic solvent having the organosilane and the catalyst dissolved therein is preferably used as the coating composition or a part of the coating composition from the standpoint of operation, and it is preferred that the solvent is not impaired in solubility of dispersibility upon mixing with the other materials, such as the fluorine-containing polymer.

Examples of the alcohol among the aforementioned organic solvents include a monohydric alcohol and a dihydric alcohol. As the monohydric alcohol, a saturated aliphatic alcohol having from 1 to 8 carbon atoms is preferred. Specific examples of the alcohol include methanol, ethanol, n-propyl alcohol, i-propyl alcohol, n-butyl alcohol, sec-butyl alcohol, tert-butyl alcohol, ethylene glycol, diethylene glycol, triethylene glycol, ethylene glycol monobutyl ether and ethylene glycol acetate monoethyl ether.

Specific examples of the aromatic hydrocarbon include benzene, toluene and xylene. Specific examples of the ether include tetrahydrofuran and dioxane. Specific examples of the ketone include acetone, methyl ethyl ketone, methyl isobutyl ketone and diisopropyl ketone. Specific examples of the ester include ethyl acetate, propyl acetate, butyl acetate propylene carbonate. These organic solvents may be used solely or as a mixture of two or more kinds thereof.

The hydrolysis reaction and the condensation reaction of the organosilane compound are preferably carried out in the presence of a catalyst. Examples of the catalyst include an inorganic acid, such as hydrochloric acid, sulfuric acid and nitric acid, an organic acid, such as oxalic acid, acetic acid, formic acid, methanesulfonic acid and toluenesulfonic acid, an inorganic base, such as sodium hydroxide, potassium hydroxide and ammonia, an organic base, such as triethylamine and pyridine, and a metallic alkoxide, such as triisopropoxy aluminum and tetrabutoxy zirconium, and an acid catalyst (including an inorganic acid and an organic acid) is preferred from the standpoint of stability in production stability of a sol solution and storage stability of a sol solution. Hydrochloric acid and sulfuric acid are preferred as an inorganic acid, and an organic acid having an acid dissociation constant in water (pKa value at 25° C.) of 4.5 or less is preferred. Hydrochloric acid, sulfuric acid and an organic acid having an acid dissociation constant in water of 2.5 or less are more preferred. An organic acid having an acid dissociation constant in water of 2.5 or less is further preferred, and methanesulfonic acid, oxalic acid, phthalic acid and malonic acid are still further preferred, with oxalic acid being particularly preferred.

The hydrolysis reaction and the condensation reaction is generally carried out by adding from 0.3 to 2 mole, preferably from 0.5 to 1 mole, of water per 1 mole of the hydrolyzable group in the organosilane, and then stirring in the presence or absence of the organic solvent, and preferably in the presence of the catalyst, at a temperature of from 25 to 100° C.

In the case where the hydrolyzable group is an alkoxide, and the catalyst is an organic solvent, the addition amount of water can be reduced since a carboxyl group or a sulfo group of the organic acid supplies protons, and the addition amount of water per 1 mole of the alkoxide group in the organosilane is generally from 0 to 2 mole, preferably from 0 to 1.5 mole, more preferably from 0 to 1 mole, and particularly preferably from 0 to 0.5 mole. In the case where an alcohol is used as the solvent, it is also preferred that substantially no water is added.

The using amount of the catalyst is generally from 0.01 to 10% by mole, and preferably from 0.1 to 5% by mole, based on the hydrolyzable group in the case where the catalyst is an inorganic acid. While the using amount thereof varies depending on the addition amount of water in the case where the catalyst is an organic acid, it is generally from 0.01 to 10% by mole, and preferably from 0.1 to 5% by mole, based on the hydrolyzable group in the case where water is added, and it is generally from 1 to 500% by mole, preferably from 10 to 200% by mole, more preferably from 20 to 200% by mole, and particularly preferably from 50 to 120% by mole, based on the hydrolyzable group in the case where substantially no water is added.

The reaction can be carried out by stirring at a temperature of from 25 to 100° C., and it is preferred that the temperature is appropriately adjusted depending on the reactivity of the organosilane.

The suitable content of sol of the organosilane varies depending on the layer, to which the organosilane is added, and in the case of the hard coat layer, it is preferably from 0.05 to 3% by wight, more preferably from 0.1 to 2% by wight, and further preferably from 0.2 to 1.2% by weight, based on the solid content other than the matt particles. In the case of the low refractive index layer, the content is preferably from 0.1 to 50% by weight, more preferably from 0.5 to 20% by wight, and particularly preferably from 2 to 15% by wight, based on the total solid content of the layer, to which the organosilane is added. Owing to the lower limit of the content of the organosilane, the effect of the invention can be better obtained. Owing to the upper limit of the content of the organosilane, too large values of the refractive index can be prevented, and the shape and the surface property of the film can be improved.

An organosilane compound itself may be preferably used in the respective layers of the invention in addition to the sol of the organosilane compound. Specific examples of the compound that can be preferably used include the compounds S-1 to S-7 exemplified for the organosilane compound. The content thereof is preferably from 3 to 20% by weight, and more preferably from 5 to 15% by wight, based on the solid content other than the matt particles of the layer, to which the compound is added.

(Transparent Support)

As the transparent support of the antireflection film of the invention, a plastic film is preferably used. Examples of a polymer forming the plastic film include a cellulose ester (such as triacetyl cellulose and diacetyl cellulose, representative examples of which include TAC-TD80U and TD80UF, produced by Fuji Photo Film Co., Ltd.), polyamide, polycarbonate, polyester (such as polyethylene terephthalate and polyethylene naphthalate), polystyrene, polyolefin, a norbornene resin (such as Arton, a trade name, produced by JSR Corp.), and amorphous polyolefin (such as Zeonex, a trade name, produced by Zeon Corp.). Among these, triacetyl cellulose, polyethylene terephthalate and polyethylene naphthalate are preferred, and triacetyl cellulose is particularly preferred.

Triacetyl cellulose has a single layer structure or is formed with plural layers. Triacetyl cellulose having a single layer structure can be produced by drum flow casting described in JP-A-7-11055 or band flow casting, and the later triacetyl cellulose formed with plural layers is produced by a so-called co-flow casting method described in JP-A-61-94725 and JP-B-62-43846. In these methods, raw material flakes are dissolved in a solvent, such as a halogenated hydrocarbon (such as dichloromethane), an alcohol (such as methanol, ethanol and butanol), an ester (such as methyl formate and methyl acetate) and an ether (such as dioxane, tetrahydrofuran and diethyl ether), to which various additives, such as a plasticizer, an ultraviolet ray absorbing agent, a degradation preventing agent, a lubricating agent and a separation accelerating agent, are added, to form a solution (which is referred to as a dope). The dope is flow-cast on a support, e.g., a horizontal endless metallic belt or a rotating drum, by a dope feeding means (referred to as a die). In the case of the single layer structure, the sole dope is flow-cast to a single layer. In the case of the plural layers, a low concentration cellulose ester dope is co-flow-cast on both sides of a high concentration dope. After drying the dope on the support to a certain extent to form a film having rigidity, the film is released from the support and then conveyed to a drying part through various conveying means to remove the solvent.

Representative examples of the solvent for dissolving triacetyl cellulose include dichloromethane. However, it is preferred that the solvent contains substantially no halogenated hydrocarbon, such as dichloromethane, from the standpoint of the global environment and the working environment. The term "substantially no halogenated hydrocarbon" means that the proportion of a halogenated hydrocarbon in an organic solvent is less than 5% by weight (preferably less than 2% by wight). In the case where a dope of triacetyl cellulose is prepared by using a solvent containing substantially no dichloromethane or the like, it is necessary to employ the following special dissolving methods.

The first dissolving method referred to as a cooling dissolving method will be described below. Triacetyl cellulose is gradually added to a solvent under stirring at a temperature around room temperature (from −10 to 40° C.). The mixture is then cooled to a temperature of from −100 to −10° C., preferably from −80 to −10° C., more preferably from −50 to −20° C., and most preferably from −50 to −30° C. The cooling operation can be carried out, for example, in a dry ice-methanol bath (at −75° C.) or in a cooled diethylene glycol solution (at −30 to −20° C.). The mixture of triacetyl cellulose and the solvent is solidified upon cooling. The mixture is then heated to a temperature of from 0 to 200° C., preferably from 0 to 150° C., more preferably from 0 to 120° C., and most preferably from 0 to 50° C., and thus, triacetyl cellulose forms a flowing solution in the solvent. The heating operation may be carried out by simply allowing to stand at room temperature or by heating in a heating bath.

The second dissolving method referred to as a high temperature dissolving method will be described below. Triacetyl cellulose is gradually added to a solvent under stirring at a temperature around room temperature (from −10 to 40° C.). In the triacetyl cellulose solution in the invention, it is preferred that triacetyl cellulose has been swollen by adding to a mixed solvent containing various solvents. In this method, the dissolved concentration of triacetyl cellulose is preferably 30% by wight or less, and it preferably as high as possible from the standpoint of drying efficiency upon forming the film. The organic solvent mixture is heated to a temperature of from 70 to 240° C., preferably from 80 to 220° C., more preferably from 100 to 200° C., and most preferably from 100 to 190° C., under pressure of from 0.2 to 30 MPa. The heated solution cannot be coated as it is, and therefore, it is necessarily cooled to a temperature equal to or lower than the lowest boiling point of the solvents used. It is a general operation in this case that the solution is returned to an ordinary pressure under cooling to a temperature of from −10 to 50° C. The cooling operation can be carried out by simply allowing the high pressure and high temperature vessel or line containing the triacetyl cellulose solution to stand at room temperature, and more preferably the apparatus may be cooled by using a cooling medium, such as cooling water. A cellulose acetate film containing substantially no halogenated hydrocarbon, such as dichloromethane, and a process for producing the same are described in Technical Disclosure No. 2002-1745 (published by Japan Institute of Invention and Innovation).

(Inorganic Filler)

As described in the foregoing, it is preferred that an inorganic filler is added to the respective layers on the support from the standpoint of improvement of the film strength. The inorganic fillers to be added to the layers may be the same as or different from each other, and it is preferred that the species and the amount thereof are appropriately adjusted depending on the refractive index, the film strength, the thickness and the coating property of the layers. The shape of the inorganic filler used in the invention is not particularly limited. For example, a spherical shape, a tabular shape, a fibrous shape, a rod shape, an irregular shape and a hollow shape may be preferably used, and a spherical shape is preferred from the standpoint of dispersibility.

The method for using the inorganic filler in the invention is not particularly limited. It may be used in a dry state or in a dispersed state in water or an organic solvent.

In the invention, it is preferred to use a dispersion stabilizer for suppressing aggregation and sedimentation of the inorganic filler. Examples of the dispersion stabilizer include polyvinyl alcohol, polyvinyl pyrrolidone, a cellulose derivative, polyamide, a phosphate ester, polyether, a surface active agent, a silane coupling agent and a titanium coupling agent. In particular, a silane coupling agent is preferred since it provides a film with high strength after curing. The addition amount of a silane coupling agent as the dispersion stabilizer is not particularly limited and is preferably added, for example, in an amount of 1 parts by wight or more per 100 parts by wight of the inorganic filler. The method for adding the dispersion stabilizer is also not particularly limited. It may be added after being hydrolyzed, or in alternative, it is possible that a silane coupling agent as the dispersion stabilizer and the inorganic filler are mixed, and the mixture is then subjected to hydrolysis and condensation. The later method is preferred.

The inorganic fillers suitable for the hard coat layer and the low refractive index layer have been described in the foregoing.

(Purposes)

The antireflection film of the invention may be provided with an adhesive layer on one surface thereof, and then it is disposed on the outermost surface of a display or used as a protective film for a polarizing plate as it is. In these cases, an outermost layer mainly containing a fluorine-containing polymer is preferably provided on the transparent support, followed by subjecting to a saponification treatment, for sufficient adhesion. The saponification treatment may be carried out by a known method, for example, the film is immersed in an alkali solution for a suitable period of time. After immersing in an alkali solution, it is preferred that the film is sufficiently washed with water or immersed in a diluted acid to neutralize the alkali component, so as to prevent the alkali component from remaining in the film.

The surface of the transparent support on the side opposite to the side having the outermost layer is imparted with hydrophilicity through the saponification treatment.

The hydrophilic surface thus formed is particularly effective for improvement of adhesion property to a polarizing film mainly containing polyvinyl alcohol. The hydrophilic surface is difficult to catch dusts in the air, and thus dusts are difficult to intervene between the polarizing film and the antireflection film upon adhering them. Therefore, it is effective to prevent spot defects due to dusts.

The saponification treatment is preferably carried out in such an extent that the contact angle to water of the surface of the transparent support opposite to the side having the outermost layer becomes 40° or less, more preferably 30' or less, and particularly preferably 20° or less.

In the case where the antireflection film of the invention is used in a liquid crystal display device, an adhesive layer is provided on one surface thereof, and the film is disposed on the outermost surface of the display. In the case where the transparent support is triacetyl cellulose, the use of the antireflection film of the invention as a protective film is preferred from the standpoint of cost because triacetyl cellulose has been used as a protective film for protecting a polarizing layer of a polarizing plate.

(Process for Producing Antireflection Film)

The layers of the antireflection film of the invention are preferably layers containing cured films formed by continuously subjecting to irradiation or heat curing after coating.

Specifically, the antireflection film of the invention can be produced in the following manner, but the invention is not limited thereto.

Coating compositions containing components for forming the respective layers are prepared. A coating composition for forming an antiglare hard coat layer is coated on a transparent support by a method, such as a dip coating method, an air knife coating method, a curtain coating method, a roller coating method, a wire bar coating method, a gravure coating method and an extrusion coating method (as described in U.S. Pat. No. 2,681,294), followed by heating and drying. Among these methods, the use of a microgravure coating method is particularly preferred. Thereafter, the coated layer is subjected to light irradiation or heating to polymerize and cure the monomer for forming the hard coat layer. The hard coat layer is thus formed through the procedures.

A smooth hard coat layer may be coated and cured depending on necessity in the similar manner before forming the antiglare hard coat layer.

A coating composition for forming a low refractive index layer is coated on the antiglare layer in the similar manner, and thus the low refractive index layer is formed through light irradiation or heating. The antireflection film of the invention is thus obtained in the aforementioned procedures.

The microgravure coating method used in the invention is a coating method having the following characteristics. A gravure roll having a diameter of about from 10 to 100 mm, and preferably about from 20 to 50 mm, and having a gravure pattern carved on the entire circumference thereof is disposed beneath the support. The gravure roll is rotated in the reverse direction to the conveying direction of the support, and the excessive coating composition on the surface of the gravure roll is scraped off with a doctor blade, whereby a constant amount of the coating composition is coated by transferring onto the lower surface of the support at such a position that the upper surface of the support is in a free state. It is preferred that the transparent support in a wound form is continuously wound off, and at least one of the hard coat layer and the low refractive index layer is coated by a microgravure coating method on one surface of the transparent support thus wound off.

As the coating conditions of the microgravure coating method, the line number of the gravure pattern carved on the gravure roll is preferably from 50 to 800 lines per inch, and more preferably from 100 to 300 lines per inch, the depth of the gravure pattern is preferably from 1 to 600 μm, and more preferably from 5 to 200 μm, the rotation number of the gravure roll is preferably from 3 to 800 rpm, and more preferably from 5 to 200 rpm, and the conveying velocity of the support is preferably from 0.5 to 100 m/min, and more preferably from 1 to 50 m/min.

The antireflection film of the invention thus produced generally has a haze value of from 3 to 55%, and preferably from 4 to 45%, and an average reflectivity at a wavelength of from 450 to 650 nm of 2.4% or less, and preferably 2.2% or less.

The antireflection film of the invention provides good antiglare property and antireflection property associated with no deterioration of a transmitted image owing to the haze value and the average reflectivity within the aforementioned ranges.

(Polarizing Plate)

A polarizing plate is constituted mainly with a polarizing film and two protective films sandwiching the polarizing film from the both sides thereof. The antireflection film of the invention is preferably used as at least one of the two protective films sandwiching the polarizing film from the both sides thereof. The production cost of the polarizing plate can be reduced by using the antireflection film of the invention as the protective film. Furthermore, reflection of outside light can be prevented by using the antireflection film of the invention as the outermost layer, whereby a polarizing plate excellent in scratch resistance and antifouling property can be obtained.

As the polarizing film, a known polarizing film and such a polarizing film that is obtained by cutting from a long sheet polarizing film having an absorption axis that is not parallel or perpendicular to the longitudinal direction can be used. The long sheet polarizing film having an absorption axis that is not parallel or perpendicular to the longitudinal direction can be produced by a method described in JP-A-2002-86554.

(Display Device)

The antireflection film of the invention can be applied to an image display device, such as a liquid crystal display (LCD), a plasma display panel (PDP), and a cathode ray tube (CRT). The antireflection film of the invention has a transparent support, and therefore, it is used by adhering the side of the transparent support to the image display surface of the image display device.

In the case where the antireflection film of the invention is used as one of surface protective films of a polarizing film, it can be preferably used in a transmission, reflection or semi-transmission type liquid crystal device of such a mode as twisted nematic (TN), super twisted nematic (STN), vertical alignment (VA), in-plane switching (IPS), optically compensated bend cell (OCB) and electrically controlled birefringence (ECB)

The liquid crystal cell of VA mode includes (1) a VA mode liquid crystal cell of the strict means, in which liquid crystalline molecules in a rod form are aligned in a substantially vertical direction upon applying no voltage but are aligned in a substantially horizontal direction upon applying voltage (described in JP-A-2-176625), and also includes (2) a liquid crystal cell of a multidomain VA mode (MVA mode) for enhancing the viewing angle (described in SID97, Digest of Tech. Papers (proceedings), vol. 28, p. 845 (1997)), (3) a liquid crystal of such a mode in that liquid crystalline molecules in a rod form are aligned in a substantially vertical direction upon applying no voltage but are aligned in a twisted multidomain upon applying voltage (described in Proceedings of Japan Liquid Crystal Symposium, p. 58 to 59 (1998)), and (4) a liquid crystal cell of a survival mode (reported in LCD International 98).

The liquid crystal cell of an OCB mode is a liquid crystal display device using a liquid crystal cell of a bend alignment mode, in which liquid crystalline molecules in a rod form are aligned in opposite (symmetrical) directions in an upper part and a lower part of the liquid crystal cell, respectively, and is described in U.S. Pat. Nos. 4,583,825 and 5,410,422. The bend alignment mode liquid crystal cell has a self optical compensation function owing to the liquid crystalline molecules in a rod form aligned in symmetrical directions in an upper part and a lower part of the liquid crystal cell, respectively. Therefore, this liquid crystal mode is also referred to as an OCB (optically compensated bend) liquid crystal mode. A liquid crystal display device of the bend alignment mode advantageously has a high response speed.

The liquid crystal cell of an ECB mode, in which liquid crystalline molecules in a rod form are aligned in a substantially horizontal direction upon applying no voltage, is most commonly used as a color TFT liquid crystal display device and described in many literatures. For example, it is described in "EL, PDP, LCD Displays", published by Toray Research Center, Inc. (2001).

In applications to TN mode and IPS mode liquid crystal display devices, in particular, it is preferred that an optical compensation film having a viewing angle enhancing effect is used on the side of one of the two protective films opposite to the antireflection film of the invention, whereby such a polarizing plate can be obtained that has an anti reflection effect and a viewing angle enhancing effect with a thickness of one polarizing plate, as described in JP-A-2001-100043.

EXAMPLE

The invention is described in more detail with reference to the following examples, but the invention is not construed as being limited thereto.

(Preparation of Organosilane Sol Composition a)

In a reactor equipped with a stirrer and a reflux condenser, 161 parts of acryloyloxypropyl trimethoxysilane, 123 parts of oxalic acid and 415 parts of ethanol were placed and mixed, and the mixture was reacted at 70° C. for 5 hours, followed by cooling to room temperature, so as to obtain an organosilane sol composition a.

(Preparation of Smooth Hard Coat Layer Coating Composition α)

347 g of a commercially available silica-containing UV curing hard coat composition (DeSolite Z7526, produced by JSR Corp., solid concentration: 72%, silica content: 38%, average particle diameter: 20 nm) was diluted with 403 g of a mixed solvent of methyl ethyl ketone and cyclohexanone in a ratio of 50/50.

(Preparation of Antiglare Hard Coat Layer Coating Composition A)

19.2 g of methyl isobutyl ketone and 27.1 g of methyl ethyl ketone were added to 84 g of an EO adduct of trimethylolpropane triacrylate (Viscoat #360, produced by Osaka Organic Chemical Industry, Ltd.), 17 g of a mixture of dipentaerythritol pentaacrylate and dipentaerythritol hexaacrylate (DPHA, produced by Nippon Kayaku Co., Ltd.) and 163 g of a commercially available silica-containing UV curing hard coat composition (DeSolite Z7526 with a modified solvent composition, produced by JSR Corp., solid concentration: ca. 72%, $SiO_2$ content in solid content: ca. 38%, containing a polymerizable monomer and a polymerization initiator). 5.8 g of a polymerization initiator (Irgacure 184, produced by Ciba Geigy Ltd.) was further added thereto, followed by stirring and mixing. A coated film obtained by coating the resulting composition, followed by curing with an ultraviolet ray, had a refractive index of 1.51. 52.2 g of a dispersion obtained by dispersing a 30% methyl isobutyl ketone dispersion of classified reinforced crosslinked polystyrene particles having an average particle diameter of 3.5 μm (SXS-350H, a trade name, produced by Soken Chemical & Engineering Co., Ltd.) in a polytron dispersing device at 10,000 rpm for 30 minutes was added to the resulting composition, and then 57.1 g of a dispersion obtained by dispersing a 30% methyl isobutyl ketone dispersion of classified reinforced crosslinked polystyrene particles having an average particle diameter of 5 μm (SXS-500H, a trade name, produced by Soken Chemical & Engineering Co., Ltd.) in a polytron dispersing device at 10,000 rpm for 30 minutes was further added thereto. Finally, 6.6 g of the organosilane sol composition a was added thereto to obtain a mixture.

The mixture was filtered with a polypropylene filter having a pore size of 30 μm to prepare an antiglare hard coat layer coating composition A.

(Preparation of Antiglare Hard Coat Layer Coating Composition B)

122 g of an EO adduct of trimethylolpropane triacrylate (Viscoat #360, produced by Osaka Organic Chemical Industry, Ltd.), 73.2 g of a mixture of dipentaerythritol pentaacrylate and dipentaerythritol hexaacrylate (DPHA, produced by Nippon Kayaku Co., Ltd.) and 10.6 g of a polymerization initiator (Irgacure 184, produced by Ciba Geigy Ltd.) were diluted with 79.3 g of methyl isobutyl ketone and 31.6 g of methyl ethyl ketone. A coated film obtained by coating the resulting composition, followed by curing with an ultraviolet ray, had a refractive index of 1.53. 48.0 g of a 30% methyl isobutyl ketone dispersion of crosslinked polystyrene particles having an average particle diameter of 3.5 μm (SXS-350H, a trade name, produced by Soken Chemical & Engineering Co., Ltd.) (dispersed in a polytron dispersing device at 10,000 rpm for 30 minutes) and 63.0 g of a 30% methyl isobutyl ketone dispersion of crosslinked polystyrene particles having an average particle diameter of 5 μm (SXS- 500H, a trade name, produced by Soken Chemical & Engineering Co., Ltd.) (dispersed in a polytron dispersing device at 10,000 rpm for 30 minutes) were added to the composition. Finally, 5.9 g of the organosilane sol composition a was added thereto, followed by stirring with a disper for 20 minutes, and then filtered with a polypropylene filter having a pore size of 30 μm to prepare an antiglare hard coat layer coating composition B.

(Preparation of Antiglare Hard Coat Layer Coating Composition C)

16.0 g of methyl isobutyl ketone and 19.8 g of methyl ethyl ketone were added to 80 g of an EO adduct of trimethylolpropane triacrylate (Viscoat #360, produced by Osaka Organic Chemical Industry, Ltd.), 21 g of a mixture of dipentaerythritol pentaacrylate and dipentaerythritol hexaacrylate (DPHA, produced by Nippon Kayaku Co., Ltd.) and 327 g of a commercially available zirconia-containing UV curing hard coat composition (DeSolite Z7404, produced by JSR Corp., solid concentration: 61%, zirconia content in solid content: 68%, average particle diameter: 20 nm, containing a polymerizable monomer and a polymerization initiator), followed by mixing by stirring. A coated film obtained by coating the resulting composition, followed by curing with an ultraviolet ray, had a refractive index of 1.70.

30.4 g of a dispersion obtained by dispersing a 30% methyl isobutyl ketone dispersion of classified reinforced crosslinked polymethyl methacrylate particles having an average particle diameter of 3 μm (MXS-300, a trade name, produced by Soken Chemical & Engineering Co., Ltd.) in a polytron dispersing device at 10,000 rpm for 30 minutes was added to the resulting composition, and then 48.5 g of a dispersion obtained by dispersing a 30% methyl isobutyl ketone dispersion of classified reinforced crosslinked polymethyl methacrylate particles having an average particle diameter of 5 μm (MXS-500, a trade name, produced by Soken Chemical & Engineering Co., Ltd.) in a polytron dispersing device at 10,000 rpm for 20 minutes was further added thereto. Finally, 9.8 g of the organosilane sol composition a was added thereto, followed by stirring with a disper for 20 minutes, and then filtered with a polypropylene filter having a pore size of 30 μm to prepare an antiglare hard coat layer coating composition C.

(Preparation of Antiglare Hard Coat Layer Coating Composition D)

An antiglare hard coat layer coating composition D was prepared in the same manner as in the coating composition C except that Viscoat #360 (produced by Osaka Organic Chemical Industry, Ltd.) used in the preparation of the coating composition C was replaced by Aronix M-350 (produced by Toagosei Co., Ltd.) (an EO adduct of trimethylolpropane triacrylate (n≈1)).

(Preparation of Antiglare Hard Coat Layer Coating Composition E)

An antiglare hard coat layer coating composition E was prepared in the same manner as in the coating composition C except that Viscoat #360 (produced by Osaka Organic Chemical Industry, Ltd.) used in the preparation of the coating composition C was replaced by an EO adduct of trimethylolpropane triacrylate (n≈6).

(Preparation of Antiglare Hard Coat Layer Coating Composition F)

An antiglare hard coat layer coating composition F was prepared in the same manner as in the coating composition C except that Viscoat #360 (produced by Osaka Organic Chemical Industry, Ltd.) used in the preparation of the coating composition C was replaced by Aronix M-320 (produced by Toagosei Co., Ltd.) (a PO adduct of trimethylolpropane triacrylate (n≈2)).

(Preparation of Antiglare Hard Coat Layer Coating Composition G)

An antiglare hard coat layer coating composition G was prepared in the same manner as in the coating composition C except that Viscoat #360 (produced by Osaka Organic Chemical Industry, Ltd.) used in the preparation of the coating composition C was replaced by an EO adduct of pentaerythritol tetraacrylate (n=2).

(Preparation of Antiglare Hard Coat Layer Coating Composition H)

76.4 g of a mixture of dipentaerythritol pentaacrylate and dipentaerythritol hexaacrylate (DPHA, produced by Nippon Kayaku Co., Ltd.) was added to 127 g of an EO adduct of trimethylolpropane triacrylate (Viscoat #360, produced by Osaka Organic Chemical Industry, Ltd.), and 10.8 g of a polymerization initiator (Irgacure 184, produced by Ciba Geigy Ltd.) was further added thereto, followed by mixing by stirring. 60.0 g of methyl isobutyl ketone and 33.0 g of methyl ethyl ketone were added thereto, followed by mixing. A coated film obtained by coating the resulting composition, followed by curing with an ultraviolet ray, had a refractive index of 1.53.

102 g of a dispersion obtained by dispersing a 30% methyl isobutyl ketone dispersion of classified reinforced crosslinked polymethyl methacrylate particles having an average particle diameter of 5 μm (MXS-500, a trade name, produced by Soken Chemical & Engineering Co., Ltd.) in a polytron dispersing device at 10,000 rpm for 20 minutes was added to the resulting composition, and then 95 g of a dispersion obtained by dispersing a 30% methyl isobutyl ketone dispersion of silica particles having an average particle diameter of 2.5 μm (Seahostar KE-P250, a trade name, produced by Nippon Shokubai Co., Ltd.) in a polytron dispersing device at 10,000 rpm for 30 minutes was further added thereto. Finally, 6.1 g of the organosilane sol composition a was added thereto, followed by stirring with a disper for 20 minutes, and then filtered with a polypropylene filter having a pore size of 30 μm to prepare an antiglare hard coat layer coating composition H.

(Preparation of Antiglare Hard Coat Layer Coating Composition I)

66.5 g of an EO adduct of trimethylolpropane triacrylate (Viscoat #360, produced by Osaka Organic Chemical Industry, Ltd.), 18.5 g of a mixture of dipentaerythritol pentaacrylate and dipentaerythritol hexaacrylate (DPHA, produced by Nippon Kayaku Co., Ltd.) and 260 g of a commercially available zirconia-containing UV curing hard coat composition (DeSolite Z7404, produced by JSR Corp., solid concentration: 61%, zirconia content in solid content: 68%, average particle diameter: 20 nm) were diluted with 56 g of methyl isobutyl ketone and 18 g of methyl ethyl ketone. 28 g of a silane coupling agent (KBM-5105, produced by Shin-Etsu Chemical Co., Ltd.) was added thereto and then mixed. A coated film obtained by coating the resulting composition, followed by curing with an ultraviolet ray, had a refractive index of 1.61.

42 g of a 30% methyl isobutyl ketone dispersion of classified reinforced crosslinked polymethyl methacrylate particles having an average particle diameter of 3 μm (MXS-300, a trade name, produced by Soken Chemical & Engineering Co., Ltd.) (a dispersion obtained by dispersing in a polytron dispersing device at 10,000 rpm for 30 minutes) was added to the resulting composition, and then 111 g of a 30% methyl isobutyl ketone dispersion of silica particles having an average particle diameter of 1.5 μm (Seahostar KE-P150, a trade name, produced by Soken Chemical & Engineering Co., Ltd.) (a dispersion obtained by dispersing in a polytron dispersing device at 10,000 rpm for 40 minutes) was further added thereto. The resulting composition was stirred with a disper for 20 minutes, and then filtered with a polypropylene filter having a pore size of 30 μm to prepare an antiglare hard coat layer coating composition I.

(Preparation of Antiglare Hard Coat Layer Coating Composition J)

16.0 g of methyl isobutyl ketone and 19.8 g of methyl ethyl ketone were added to 80 g of an EO adduct of trimethylolpropane triacrylate (Viscoat #360, produced by Osaka Organic Chemical Industry, Ltd.), 21 g of trimethylolpropane triacrylate (Viscoat #295, produced by Osaka Organic Chemical Industry, Ltd.) and 327 g of a commercially available zirconia-containing UV curing hard coat composition (DeSolite Z7404, produced by JSR Corp., solid concentration: 61%, zirconia content in solid content: 68%, average particle diameter: 20 nm, containing a polymerizable monomer and a polymerization initiator), followed by mixing by stirring. A coated film obtained by coating the resulting composition, followed by curing with an ultraviolet ray, had a refractive index of 1.70.

30.4 g of a dispersion obtained by dispersing a 30% methyl isobutyl ketone dispersion of classified reinforced crosslinked polymethyl methacrylate particles having an average particle diameter of 3 μm (MXS-300, a trade name, produced by Soken Chemical & Engineering Co., Ltd.) in a polytron dispersing device at 10,000 rpm for 30 minutes was added to the resulting composition, and then 48.5 g of a dispersion obtained by dispersing a 30% methyl isobutyl ketone dispersion of classified reinforced crosslinked polymethyl methacrylate particles having an average particle diameter of 5 μm (MXS-500, a trade name, produced by Soken Chemical & Engineering Co., Ltd.) in a polytron dispersing device at 10,000 rpm for 20 minutes was further added thereto. Finally, 9.8 g of the organosilane sol composition a was added thereto, followed by stirring with a disper for 20 minutes, and then filtered with a polypropylene filter having a pore size of 30 μm to prepare an antiglare hard coat layer coating composition J.

(Preparation of Antiglare Hard Coat Layer Coating Composition U)

A comparative antiglare hard coat layer coating composition U was prepared in the same manner as in the coating composition A except that the EO adduct of trimethylolpropane triacrylate (Viscoat #360, produced by Osaka Organic Chemical Industry, Ltd.) used in the preparation of the coating composition A was not used, and the amount of the mixture of dipentaerythritol pentaacrylate and dipentaerythritol hexaacrylate (DPHA, produced by Nippon Kayaku Co., Ltd.) was increased to 101 g.

(Preparation of Antiglare Hard Coat Layer Coating Composition V)

A comparative antiglare hard coat layer coating composition V was prepared in the same manner as in the coating composition B except that the EO adduct of trimethylolpropane triacrylate (Viscoat #360, produced by Osaka Organic Chemical Industry, Ltd.) used in the preparation of the coating composition B was not used, and the amount of the mixture of dipentaerythritol pentaacrylate and dipentaerythritol hexaacrylate (DPHA, produced by Nippon Kayaku Co., Ltd.) was increased to 195.2 g.

(Preparation of Antiglare Hard Coat Layer Coating Composition W)

A comparative antiglare hard coat layer coating composition W was prepared in the same manner as in the coating composition C except that the EO adduct of trimethylolpropane triacrylate (Viscoat #360, produced by Osaka Organic Chemical Industry, Ltd.) used in the preparation of the coating composition C was not used, and the amount of the mixture of dipentaerythritol pentaacrylate and dipentaerythritol hexaacrylate (DPHA, produced by Nippon Kayaku Co., Ltd.) was increased to 101 g.

(Preparation of Antiglare Hard Coat Layer Coating Composition X)

A comparative antiglare hard coat layer coating composition X was prepared in the same manner as in the coating composition H except that the EO adduct of trimethylolpropane triacrylate (Viscoat #360, produced by Osaka Organic Chemical Industry, Ltd.) used in the preparation of the coating composition H was not used, and the amount of the mixture of dipentaerythritol pentaacrylate and dipentaerythritol hexaacrylate (DPHA, produced by Nippon Kayaku Co., Ltd.) was increased to 203.4 g.

(Preparation of Antiglare Hard Coat Layer Coating Composition Y)

A comparative antiglare hard coat layer coating composition Y was prepared in the same manner as in the coating composition I except that the EO adduct of trimethylolpropane triacrylate (Viscoat #360, produced by Osaka Organic Chemical Industry, Ltd.) used in the preparation of the coating composition I was not used, and the amount of the mixture of dipentaerythritol pentaacrylate and dipentaerythritol hexaacrylate (DPHA, produced by Nippon Kayaku Co., Ltd.) was increased to 85 g.

(Preparation of Antiglare Hard Coat Layer Coating Composition Z)

A comparative antiglare hard coat layer coating composition Z was prepared in the same manner as in the coating composition J except that the EO adduct of trimethylolpropane triacrylate (Viscoat #360, produced by Osaka Organic Chemical Industry, Ltd.) used in the preparation of the coating composition J was not used, and the amount of the trimethylolpropane triacrylate (Viscoat #295, produced by Osaka Organic Chemical Industry, Ltd.) was increased to 101 g.

(Preparation of Low Refractive Index Layer Coating Composition 1)

14 g of silica sol (MEK-ST, produced by Nissan Chemical Industries, Ltd., average particle diameter: 15 nm, solid concentration: 30%), 4.0 g of the organosilane sol composition a, 30 g of methyl ethyl ketone and 6.0 g of cyclohexanone were added to 150 g of a thermal crosslinking fluorine-containing polymer having a refractive index of 1.42 (JN-7228, produced by JSR Corp., solid concentration: 6%), followed by stirring, and the resulting composition was filtered with a polypropylene filter having a pore size of 1 μm to prepare a low refractive index layer coating composition 1.

(Preparation of Low Refractive Index Layer Coating Composition 2)

14 g of silica sol (a product similar to MEK-ST with a different particle diameter, produced by Nissan Chemical Industries, Ltd., average particle diameter: 45 nm, solid concentration: 30%), 4.0 g of the organosilane sol composition a, 30 g of methyl ethyl ketone and 6.0 g of cyclohexanone were added to 150 g of a thermal crosslinking fluorine-containing polymer having a refractive index of 1.42 (JN-7228, produced by JSR Corp., solid concentration: 6%), followed by stirring, and the resulting composition was filtered with a polypropylene filter having a pore size of 1 μm to prepare a low refractive index layer coating composition 2.

Example 1

A smooth hard coat layer α, antiglare hard coat layers A to J and U to Z, and low refractive index layers 1 and 2 were coated in the following manner. The combinations of layers thus accumulated are shown in Table 1 below.

(1) Coating of Smooth Hard Coat Layer

A triacetyl cellulose film having a thickness of 80 μm (TAC-TD80U, produced by Fuji Photo Film Co., Ltd.) in a roll form was wound off, and the aforementioned smooth hard coat layer coating composition was coated thereon by using a microgravure roll having a gravure pattern having a diameter of 50 mm with a line number of 180 per inch and a depth of 40 μm and a doctor blade under conditions of a gravure roll rotation number of 30 rpm and a conveying velocity of 10 m/min. After drying the coated layer at 120° C. for 2 minutes, the coated layer was cured by irradiating an ultraviolet ray of an illuminance of 400 mW/cm$^2$ and a dose of 300 mJ/cm$^2$ under nitrogen purge with an oxygen concentration of 0.1% or less by using an air-cooling metal halide lamp of 160 W/cm (produced by Eyegraphics Co., Ltd.) to form a smooth hard coat layer having a thickness of 2.5 μm, followed by winding.

(2) Coating of Antiglare Hard Coat Layer

A triacetyl cellulose film having a thickness of 80 μm (TAC-TD80U, produced by Fuji Photo Film Co., Ltd.) in a roll form was wound off, or a triacetyl cellulose film having the smooth hard coat layer formed thereon was again wound off, and the aforementioned antiglare hard coat layer coating composition was coated thereon by using a microgravure roll having a gravure pattern having a diameter of 50 mm with a line number of from 180 to 140 per inch and a depth of 40 μm and a doctor blade under conditions of a gravure roll rotation number of 30 rpm and a conveying velocity of 5 m/min. After drying the coated layer at 120° C. for 4 minutes, the coated layer was cured by irradiating an ultraviolet ray of an illuminance of 400 mW/cm$^2$ and a dose of 300 mJ/cm$^2$ under nitrogen purge by using an air-cooling metal halide lamp of 160 W/cm (produced by Eyegraphics Co., Ltd.) to form an antiglare hard coat layer having a thickness of from 2.5 to 4.5 μm, followed by winding.

(3) Coating of Low Refractive Index Layer

A triacetyl cellulose film having the smooth hard coat layer and the antiglare hard coat layer formed thereon or only the antiglare hard coat layer formed thereon was again wound off, and the aforementioned low refractive index layer coating composition was coated thereon by using a microgravure roll having a gravure pattern having a diameter of 50 mm with a line number of 180 per inch and a depth of 40 μm and a doctor blade under conditions of a gravure roll rotation number of 30 rpm and a conveying velocity of 10 m/min. After drying the coated layer at 80° C. for 2 minutes, the coated layer was cured by irradiating an ultraviolet ray of an illuminance of 400 mW/cm$^2$ and a dose of 300 mJ/cm$^2$ under nitrogen purge by using an air-cooling metal halide lamp of 240 W/cm (produced by Eyegraphics Co., Ltd.) and crosslinked by heating to 140° C. for 10 minutes to form a low refractive index layer having a thickness of 0.096 μm, followed by winding.

TABLE 1

| Sample No. | Smooth hard coat layer coating composition | Antiglare hard coat layer coating composition | Low refractive index layer coating composition |
|---|---|---|---|
| 101 (invention) | α | A | 1 |
| 102 (invention) | α | C | 1 |
| 103 (invention) | none | A | 1 |
| 104 (invention) | none | B | 1 |
| 105 (invention) | none | C | 1 |
| 106 (invention) | none | D | 1 |
| 107 (invention) | none | E | 1 |
| 108 (invention) | none | F | 1 |
| 109 (invention) | none | G | 1 |
| 110 (invention) | none | H | 1 |
| 111 (invention) | none | I | 1 |
| 112 (invention) | none | J | 1 |
| 113 (comparison) | none | U | 1 |
| 114 (comparison) | none | V | 1 |
| 115 (comparison) | none | W | 1 |
| 116 (comparison) | none | X | 1 |
| 117 (comparison) | none | Y | 1 |
| 118 (comparison) | none | Z | 1 |
| 119 (invention) | none | A | 2 |
| 120 (invention) | none | B | 2 |
| 121 (invention) | none | C | 2 |
| 122 (invention) | none | H | 2 |
| 123 (invention) | none | I | 2 |

(Evaluation of Antireflection Film)

The resulting films were evaluated for the following items.

(1) Average Reflectivity

A spectral reflectivity in a wavelength region of from 380 to 780 nm at an incident angle of 5° was measured by using a spectrophotometer (produced by JASCO Co., Ltd.). The results were shown in terms of an average reflectivity of from 450 to 650 nm.

(2) Haze

The haze of the resulting film was measured with a haze meter (Model 1001DP, produced by Nippon Denshoku Industries, Co., Ltd.).

(3) Evaluation of Pencil Hardness

As an index of scratch resistance, evaluation for pencil hardness according to JIS K5400 was carried out. The antireflection film was conditioned at a temperature of 25° C. and a relative humidity of 60% for 2 hours and then scratched with a 3H test pencil defined by JIS S6006 under a load of 1 kg. The evaluation was made by the following standard.
A: No scratch was found in 5 samples tested.
B: 1 or 2 scratches were found in 5 samples tested.
C: 3 or more scratches were found in 5 samples tested.

(4) Evaluation of Contact Angle and Adhesion of Finger Mark

As an index of antifouling property, the antireflection film sample was conditioned at a temperature of 25° C. and a relative humidity of 60% for 2 hours and then measured for a contact angle with water. After attaching a finger mark to the surface of the sample, the finger mark was wiped off with a cleaning cloth, and the conditions were observed to evaluate the adhesion of a finger mark by the following standard.
A: The finger mark was completely wiped off.
B: The finger mark was slightly visible.
C: The finger mark substantially could not be wiped off.

(5) Dynamic Friction Coefficient

As an Index of surface lubricating property, the antireflection film sample was evaluated for a dynamic friction coefficient. The sample was conditioned at a temperature of 25° C.

and a relative humidity of 60% for 2 hours and then measured by using a dynamic friction measuring apparatus, HEIDON-14, with a stainless steel ball having a diameter of 5 mm at a load of 100 g and a velocity of 60 cm/min.

(6) Evaluation of Antiglare Property

A naked fluorescent lamp (8,000 cd/m$^2$) was mirrored on the antireflection film, and an extent of blur of the mirrored image was evaluated by the following standard.
AA: The outline of the fluorescent lamp was substantially not recognized.
A: The outline of the fluorescent lamp was slightly recognized.
B: The fluorescent lamp was blurred, but the outline was recognized.
C: The fluorescent lamp was substantially no blurred.

(7) Evaluation of Glare

Diffused light from a fluorescent lamp covered with a louver was reflected on the antireflection film, and the surface glare was evaluated by the following standard.
A: Substantially no glare was observed.
B: Slight glare was observed.
C: Glare in a visible size was observed.

(8) Evaluation of Scratch Resistance with Steel Wool

The antireflection film was subjected to a rubbing test by using a rubbing tester under the following conditions.
Conditioning condition of sample: 25° C., 60% RH for 2 hour or more
Rubbing material: Steel wool (Grade No. 0000, produced by Nihon Steel Wool Co., Ltd.) was involved on a rubbing tip end (1 cm square) of the tester in contact with the sample, and fixed with a band.
Moving distance (one way): 13 cm
Rubbing velocity: 13 cm/sec
Load: 200 g/cm$^2$
Contact area of tip end: 1 cm square
Number of rubbing: 10 reciprocations An oily black ink was coated on the back surface of the sample thus subjected to the rubbing test, and scratches on the rubbed part was visually observed with reflected light by the following standard.
AA: Completely no scratch was observed under careful observation.
A: Slight thin scratches were observed under careful observation.
AB: Thin scratches were observed.
B: Moderate scratches were observed.
C: Thick scratches were instantly observed.

(9) Evaluation for Resistance to Moistened Cotton Bud Rubbing

A cotton bud was fixed at a tip end of a rubbing tester. A sample was fixed at upper and lower end with clips in a smooth dish, and the sample and the cotton bud were immersed in water at 25° C. at a room temperature of 25° C. The sample was rubbed with the cotton bud under a load of 300 g in various rubbing numbers. The conditions for rubbing were as follows.

Rubbing distance (one way): 1 cm
Rubbing velocity: about 2 reciprocations per second The sample having been rubbed was observed, and the rubbing resistance was evaluated in terms of a number of rubbing upon occurring peeling of the film by the following standard.
C: The film was peeled on 0 to 30 reciprocations.
BC: The film was peeled on 10 to 30 reciprocations.
B: The film was peeled on 30 to 50 reciprocations.
AB: The film was peeled on 50 to 100 reciprocations.
A: The film was peeled on 100 to 150 reciprocations.
AA: The film was not peeled over 150 reciprocations.

(10) Evaluation for Center Line Average Roughness (Ra)

The antiglare antireflection film thus produced was measured for the center line average roughness (Ra) by using a surface roughness meter (AY22, produced by Kosaka Laboratory, Ltd.). It was found that the value of the center line average roughness (Ra) is an important index upon developing an antiglare antireflection film applicable to a high definition monitor. When the number is smaller, the film is applicable to a high definition monitor.

(11) Evaluation for Haze Surface Property

The antiglare antireflection film thus produced was cut into a sample of 18×30 cm, and the back surface of the sample (i.e., the opposite surface to the low refractive index layer) was daubed with a black permanent felt marker. The surface property on the side of the low refractive index layer was observed under a fluorescent lamp to evaluate haze surface property by the following standard.
A: Uniform reflected light was observed over the surface, and no haze was found.
B: Thin unevenness of reflected light in a haze (patch) form was found in some places.
C: Unevenness of reflected light in a haze form was found over the surface.

The evaluation results will be described in detail. The samples of the invention among the samples resulted the grade A for the adhesion of a finger mark, the grade A to B for the antiglare property, the grade A for the glare, and a range of from 100 to 103° for the contact angle. The dynamic friction coefficient thereof was in a range of from 0.07 to 0.1, which was preferred. The antireflection property and the pencil hardness thereof were such values that exceeded the level required by an antiglare antireflection film.

The other evaluation results are shown in Table 2.

It was found that the samples 101 to 112 and 119 to 123 according to the invention were excellent in scratch resistance with steel wool in comparison to the comparative samples 113 to 118. It is apparent that these results are obtained owing to the effect of the invention, in which the EO or PO adduct of a polyfunctional acrylate compound (A) is used in combination with the polyfunctional acrylate monomer having no oxide added (B), in comparison to the conventional constitution, in which only the monomer (B) is used.

As a result of evaluation of the sample 105 of the invention and the comparative sample 115 for haze surface property, thin haze unevenness of reflection light was found in the sample 115, but the sample 105 exhibited no haze unevenness of reflected light to provide a clean surface property.

TABLE 2

| Sample No. | Average reflectivity (%) | Haze (%) | Pencil hardness | Steel wool scratch resistance | Moistened cotton dub rubbing | Ra (μm) |
| --- | --- | --- | --- | --- | --- | --- |
| 101 (invention) | 2.1 | 43 | A | A | A | 0.13 |
| 102 (invention) | 2.1 | 48 | A | A | A | 0.13 |
| 103 (invention) | 2.2 | 42 | A | A | A | 0.14 |

TABLE 2-continued

| Sample No. | Average reflectivity (%) | Haze (%) | Pencil hardness | Steel wool scratch resistance | Moistened cotton dub rubbing | Ra (μm) |
|---|---|---|---|---|---|---|
| 104 (invention) | 2.2 | 41 | B | A | A | 0.13 |
| 105 (invention) | 2.1 | 49 | A | A | A | 0.14 |
| 106 (invention) | 2.2 | 48 | A | A | A | 0.13 |
| 107 (invention) | 2.1 | 47 | B | AA | A | 0.13 |
| 108 (invention) | 2.1 | 48 | A | A | A | 0.13 |
| 109 (invention) | 2.2 | 48 | A | A | A | 0.13 |
| 110 (invention) | 2.3 | 23 | B | A | A | 0.12 |
| 111 (invention) | 2.1 | 53 | A | A | A | 0.11 |
| 112 (invention) | 2.2 | 43 | B | A | A | 0.13 |
| 113 (comparison) | 2.2 | 43 | A | B | A | 0.13 |
| 114 (comparison) | 2.1 | 42 | B | B | A | 0.13 |
| 115 (comparison) | 2.2 | 49 | A | B | A | 0.13 |
| 116 (comparison) | 2.3 | 24 | B | B | A | 0.13 |
| 117 (comparison) | 2.1 | 53 | A | C | A | 0.11 |
| 118 (comparison) | 2.2 | 44 | B | B | A | 0.13 |
| 119 (invention) | 2.2 | 42 | B | AA | A | 0.14 |
| 120 (invention) | 2.3 | 50 | A | A | A | 0.14 |
| 121 (invention) | 2.2 | 24 | B | AA | A | 0.14 |
| 122 (invention) | 2.3 | 43 | A | AA | A | 0.14 |
| 123 (invention) | 2.2 | 54 | A | A | A | 0.12 |

Antiglare antireflection polarizing plates were produced by using the films of samples 101 to 112 and 119 to 123 according to the invention. Liquid crystal display devices were produced by using the polarizing plates with the antireflection films being disposed as the outermost layer. Excellent contrast without reflection of outside light was obtained, and excellent visibility is obtained with indistinct mirrored images owing to the antiglare property.

Liquid crystal display devices were then produced by combining the samples according to the invention with a polarizer, an optical compensation film containing a transparent support and an optical anisotropic layer having a discotic liquid crystal fixed in orientation, and a polarizing plate having a light scattering layer. The evaluation for visibility of the liquid crystal display devices revealed that excellent contrast was obtained, and excellent performance was obtained with indistinct mirrored images owing to the antiglare property.

(Saponification Treatment of Antireflection Film)

The samples 101 to 123 in Example 1 were subjected to the following treatment.

A 1.5 N sodium hydroxide aqueous solution was prepared and maintained at 50° C. A 0.01 N dilute sulfuric acid aqueous solution was prepared.

The antireflection film thus produced was immersed in the sodium hydroxide aqueous solution for 2 minutes and then immersed in water to rinse away the sodium hydroxide aqueous solution. Subsequently, the antireflection film was immersed in the dilute sulfuric acid aqueous solution for 1 minute and then immersed in water to rinse away the dilute sulfuric acid aqueous solution. The antireflection film was sufficiently dried at 100° C.

The antireflection films having been subjected to the saponification treatment thus produced were evaluated in the following manner.

(12) Evaluation of Peeling of Film Due to Saponification Treatment 100 sheets of the antireflection films were subjected to the saponification treatment, and the presence of peeling of the film before and after the saponification treatment was evaluated by the following three grades.

A: Completely no peeling was observed in all the 100 sheets.
B: Peeling was observed in 5 sheets or less.
C: Peeling was observed in more than 5 sheets.

(13) Evaluation of Crosscut Adhesion

A protective film for a polarizing plate was conditioned at a temperature of 25° C. and a relative humidity of 60% for 2 hours. The surface of the outermost layer of the protective film for a polarizing plate was crosscut in 11 by 11 lines. A polyester adhesive tape (No. 31B, produced by Nitto Denko Corp.) was attached and well adhered on the crosscut surface and then quickly peeled therefrom. The operation of adhering and peeling the adhesive tape was repeated three times on the same position of the protective film, and the presence of peeling of the film was visually observed by the following three grades.

A: Completely no peeling was observed on 100 squares.
B: Peeling was observed on 2 or less squares.
C: Peeling was observed on more than 2 squares.

As a result of the evaluation of adhesion, no peeling due to the saponification treatment and no peeling on the crosscut surface were observed in all the samples of Example 1.

The samples of the invention were measured for a contact angle with water on the opposite surface to the side having the hard coat layer and the low refractive index layer, and thus the contact angle was in a range of from 40 to 30° for all the samples.

Example 2

Figure 2:
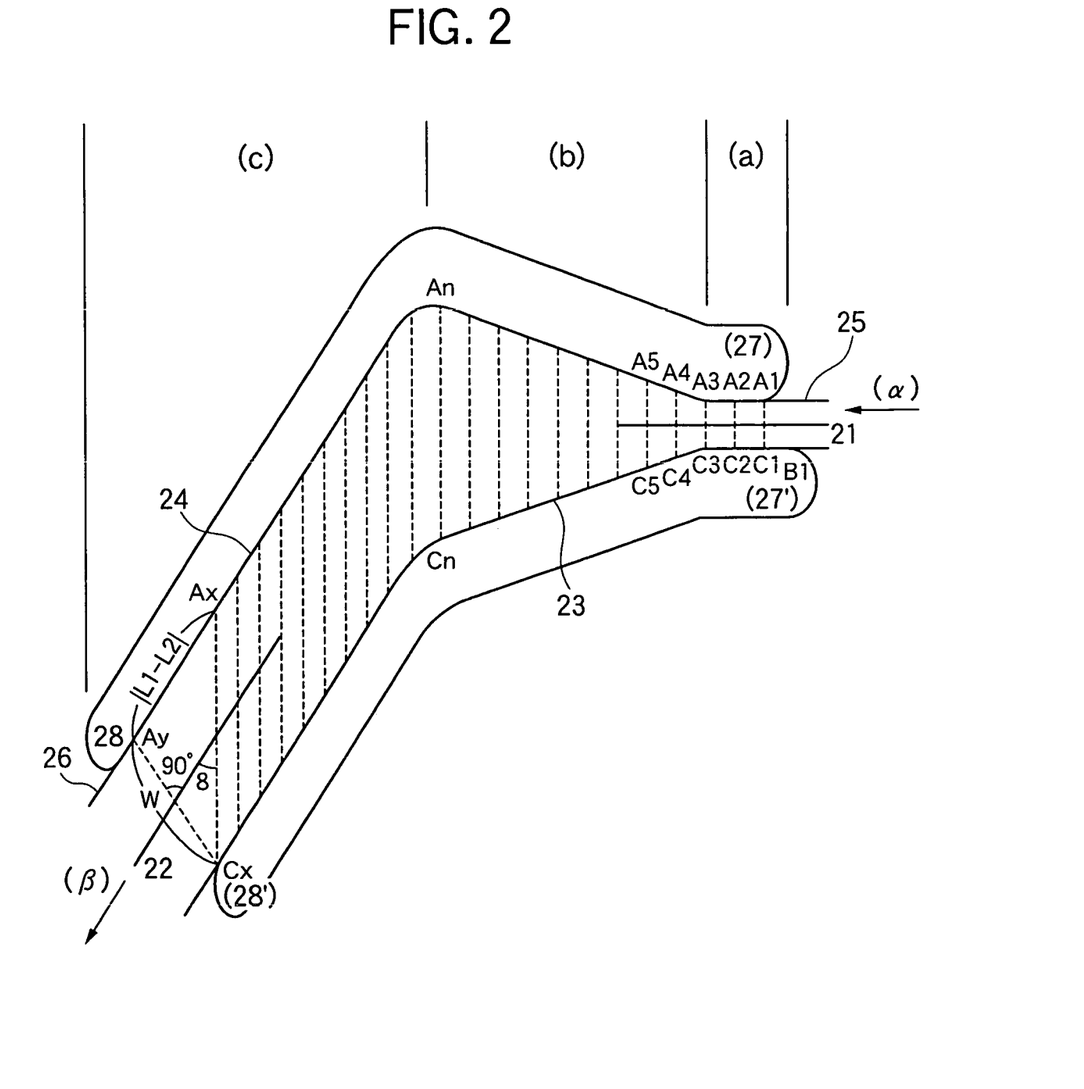
FIG. 2 is a schematic illustration showing a tenter stretching machine used in Example 2.

A PVA (polyvinyl alcohol) film was immersed in an aqueous solution containing 2.0 g/L of iodine and 4.0 g/L of potassium iodide at 25° C. for 240 seconds and then immersed in an aqueous solution containing 10 g/L of boric acid at 25° C. for 60 seconds. The film was then introduced into a tenter stretching machine having the constitution shown in FIG. 2 to stretch by 5.3 times. The tenter was inflected with respect to the stretching direction as shown in FIG. 2 and then the width was maintained constant. The film was dried in an 80° C. atmosphere and then released from the tenter. The difference in conveying velocity between the tenter clips on both side thereof was less than 0.05%, and the angle between the center line of the film thus introduced and the center line of the film transferred to the next process was 46°. The difference in travels between the film retaining means on both sides of the tenter |L1−L2| was 0.7 m, and the substantial width of the film at the end of stretching process W was 0.7 m, i.e., the relationship |L1−L2|=W was satisfied. The substantial stretching direction at the outlet of the tenter descended with respect to the center line 22 of the film transferred to the next process by 45°. No wrinkle or deformation was observed in the film at the outlet of the tenter.

Fujitac, produced by Fuji Photo Film Co., Ltd. (cellulose triacetate film having a retardation value of 3.0 nm) was adhered to the stretched film by using a 3% PVA aqueous solution (PVA-117H, produced by Kuraray Co., Ltd.) as an adhesive, and dried at 80° C. to obtain a polarizing plate having an effective width of 650 mm. The direction of the absorption axis of the polarizing plate thus obtained descended with respect to the longitudinal direction by 45°. The polarizing plate had a transmittance of 43.7% and a polarization degree of 99.97% at 550 nm. The polarizing plate was cut into a size of 310×233 mm in such a manner that an edge to be cut was exactly in parallel to the longitudinal direction of the web film to obtain a polarizing plate having an area efficiency of 91.5% and an absorption axis descending with respect to the edge by 45°.

The films of the samples 101 to 112 and 119 to 123 of the invention in Example 1 having been subjected to the saponification treatment were adhered to the aforementioned polarizing plate to produce polarizing plates having an antiglare and antireflection film. Liquid crystal display devices having the antireflection layer on the outermost surface were produced by using the polarizing plates. Excellent contrast was obtained without reflection of outside light, and good visibility was obtained with indistinct mirrored images owing to the antiglare property.

Example 3

Polarizing plates were produced in the same manner as in Example 2 except that, in the production of the polarizing plate having an absorption axis descending by 45°, the films of the samples 101 to 112 and 119 to 123 of the invention in Example 1 having been subjected to the saponification treatment were used instead of Fujitac, produced by Fuji Photo Film Co., Ltd. (cellulose triacetate film having a retardation value of 3.0 nm). Liquid crystal display devices having the antireflection layer on the outermost surface were produced by using the polarizing plates. Excellent contrast was obtained without reflection of outside light, and good visibility was obtained with indistinct mirrored images owing to the antiglare property, as similar to Example 2.

Example 4

The samples 101 to 112 and 119 to 123 of the invention in Example 1 were immersed in a 1.5 N sodium hydroxide aqueous solution at 55° C. for 2 minutes, followed by neutralizing and washing with water, to subject the triacetyl cellulose surface on the back surface to a saponification treatment. The films thus obtained were adhered on one surface of a polarizing film produced by adsorbing iodine to polyvinyl alcohol, followed by stretching. A triacetyl cellulose film having a thickness of 80 μm (TAC-TD80U, produced by Fuji Photo Film Co., Ltd.) having been subjected to a saponification treatment in the same conditions as above was adhered on another surface of the polarizing films to produce polarizing plates. The polarizing plates thus produced were adhered to make the antireflection film as the outermost layer by replacing with a polarizing plate on a viewing side of a liquid crystal display device (D-BEF, produced by Sumitomo 3M, Ltd., a polarization split film having a polarization selecting layer between a backlight and liquid crystal cells) for a notebook personal computer having a transmission TN liquid crystal display device. As a result, a display device having considerably high display quality with significantly less reflection of background was obtained.

Example 5

In transmission TN liquid crystal cells having the samples 101 to 112 and 119 to 123 of the invention produced in Example 1, a viewing angle enhancing film (Wide-View Film SA-12B, produced by Fuji Photo Film Co., Ltd.), in which the disk surface of the discotic structural unit descended with respect to the surface of the transparent support, and an angle formed between the disk surface of the discotic structural unit and the transparent support varied in the depth direction of the optically anisotropic layer, was used as a protective film on the liquid crystal cell side of the polarizing plate of viewing side and a protective film on the liquid crystal cell side of the polarizing plate on the backlight side. As a result, such liquid crystal display devices were obtained that had excellent contrast in a bright room, considerably wide vertical and horizontal viewing angles, significantly excellent visibility and high display quality.

Example 6

The samples 101 to 112 and 119 to 123 of the invention produced in Example 1 were adhered on a glass plate on a surface of an organic EL display device through an adhesive. As a result, such display devices were obtained that were suppressed in reflection on the glass surface and had high visibility.

Example 7

Polarizing plates having an antireflection film on one surface were produced by using the sample 101 to 112 and 119 to 123 of the invention produced in Example 1. A λ/4 plate was adhered on the surface of the polarizing plate opposite to the side having the antireflection film, and the polarizing plate was adhered on the glass plate on the surface of an organic EL display device. As a result, reflection on the surface and reflection on the interior of the surface glass plate were suppressed to obtain display devices having high visibility.

INDUSTRIAL APPLICABILITY

According to the invention, the scratch resistance can be improved while maintaining the sufficient antireflection capability and antifouling property by using the ethylene oxide or propylene oxide adduct of a polyfunctional acrylate monomer (A), and the polyfunctional acrylate monomer having no oxide added (B) in combination, and therefore, such an antireflection film can be provided that is suppressed in defects of haze surface property of the coated film. Furthermore, such a process for producing an antireflection film can be provided that is capable of producing with high productivity. Moreover, a display device having high visibility can be provided.

The invention claimed is:

1. An antireflection film comprising a transparent support, at least one hard coat layer and a low refractive index layer, in this order, wherein the hard coat layer includes a polymerized product of (A) at least one ethylene oxide or propylene oxide adduct of a tri- to hexa-functional acrylate monomer and (B) at least one tri- to hexa-functional acrylate monomer having no oxide adduct, wherein the total content of (A) and (B) is from 30 to 100% by weight, based on a total binder polymer content used to form the polymerized product, wherein the ratio by weight of (A) to (B) is from 20/80 to 80/20, and wherein the at least one monomer (B) is a mixture of dipentaerythritol hexa(meth)acrylate and dipentaerythritol penta(meth)acrylate.

2. The antireflection film as described in claim 1, wherein the monomer (A) has ethylene oxide or propylene oxide in a molar number of 1 to 15.

3. The antireflection film as described in claim 1, wherein the monomer (A) is an ethylene oxide adduct of trimethylolpropane tri(meth)acrylate.

4. The antireflection film as described in claim 1, wherein the hard coat layer includes a binder and mall particles having an average particle diameter of from 1.0 to 10.0 μm, and the binder has a refractive index of from 1.48 to 2.00.

5. The antireflection film as described in claim 1, wherein the hard coat layer includes an inorganic filler containing at least one oxide selected from the group consisting of oxides of zirconium, titanium, aluminum, indium, zinc, tin, antimony and silicon.

6. The antireflection film as described in claim 1, wherein the low refractive index layer includes an inorganic filler containing silica or magnesium fluoride.

7. The antireflection film as described in claim 6, wherein the inorganic filler contained in the low refractive index layer has an average particle diameter of from 0.001 to 0.2 μm.

8. The antireflection film as described in claim 1, wherein each layer of the antireflection film is a cured film cured by irradiation of radiation or heat continuously after coating.

9. A process for producing an antireflection film, wherein the antireflection film is the antireflection film as described in claim 1, and the process comprises: continuously winding off a transparent support in a roll form; and coating by a microgravure coating method at least one of a hard coat layer and a low refractive index layer on one surface of the transparent support thus wound off.

10. A polarizing plate comprising a polarizing film and two protective films, wherein at least one of the two protective films is the antireflection film as described in claim 1.

11. A display device comprising the antireflection film as described in claim 1, wherein the low refractive index layer of the antireflection film is the outermost layer of a display.

12. The antireflection film as described in claim 1, wherein the at least one adduct (A) comprises at least one adduct selected from the group consisting of:

(A-1) ethylene oxide adduct of trimethylolpropane tri(meth)acrylate (n=1), (A-2) ethylene oxide adduct of trimethylolpropane tri(meth)acrylate (n=1.5), (A-3) ethylene oxide adduct of trimethylolpropane tri(meth)acrylate (n=2), (A-4) ethylene oxide adduct of trimethylolpropane tri(meth)acrylate (n=6), (A-5) propylene oxide adduct of trimethylolpropane tri(meth)acrylate (n=1), (A-6) propylene oxide adduct of trimethylolpropane tri(meth)acrylate (n=2), (A-7) ethylene oxide adduct of glycerin tri(meth)acrylate (n=2), (A-8) propylene oxide adduct of glycerin tri(meth)acrylate (n=2), (A-9) ethylene oxide adduct of pentaerythritol tetra(meth)acrylate (n=2), (A-10) propylene oxide adduct of pentaerythritol tetra(meth)acrylate (n=2), (A-11) ethylene oxide adduct of ditrimethylolpropane tetra(meth)acrylate (n=2), (A-12) propylene oxide adduct of ditrimethylolpropane tetra(meth)acrylate (n=2), (A-13) ethylene oxide adduct of dipentaerythritol penta(meth)acrylate (n=1.5), (A-14) ethylene oxide adduct of dipentaerythritol hexa(meth)acrylate (n=1), (A-15) propylene oxide adduct of dipentaerythritol penta(meth)acrylate (n=1.5), (A-16) propylene oxide adduct of dipentaerythritol hexa(meth)acrylate (n=1), and (A-17) tris(2-hydroxyethyl)isocyanurate tri(meth)acrylate.

13. The antireflection film as described in claim 12, wherein the at least one adduct (A) comprises at least one adduct selected from the group consisting of (A-1), (A-2) and (A-10).

* * * * *